United States Patent [19]

Schlesinger et al.

[11] Patent Number: 4,507,956
[45] Date of Patent: Apr. 2, 1985

[54] CIRCUIT MOUNTING APPARATUS

[75] Inventors: Lawrence Schlesinger, Durham; Dale F. German, Semora; Donald L. Richards, Durham, all of N.C.

[73] Assignee: Eaton Corporation, Cleveland, Ohio

[21] Appl. No.: 530,558

[22] Filed: Sep. 9, 1983

[51] Int. Cl.$^3$ .................. G01L 19/00; B60C 23/00
[52] U.S. Cl. .................. 73/146.5; 24/205; 24/270; 73/756; 152/340; 200/61.25; 340/58
[58] Field of Search .................. 152/330 R, 331, 427, 152/428, 429, 157, 158, 378 R, 386; 116/34 R; 73/146.5, 146.4, 146.3, 756; 264/272.11, 272.15; 200/61.25; 24/270, 284, 274 WB, 205, 283; 340/58

[56] References Cited

U.S. PATENT DOCUMENTS

| | | | |
|---|---|---|---|
| 2,723,700 | 11/1955 | Caldwell | 152/418 |
| 4,235,184 | 11/1980 | Schiavone | 116/34 R |
| 4,335,283 | 6/1982 | Migrin | 200/61.25 |
| 4,350,854 | 9/1982 | Matsuda et al. | 200/61.25 |
| 4,409,586 | 10/1983 | Hochstein | 73/146.5 X |

Primary Examiner—William A. Powell
Assistant Examiner—Thomas Bokan
Attorney, Agent, or Firm—C. H. Grace; F. M. Sajovec

[57] ABSTRACT

An electrical circuit element (16) is maintained in place within the drop center (24) of a vehicle wheel (10) by encasing the circuit within a cylindrical plastic housing (14) which is formed into an arcuate shape. The housing is held in place by wires (18, 19) which are connected to the ends of an extension spring (22) which applies sufficient tension to keep the housing from moving during heavy braking or due to centrifugal force. The mounting assembly is configured to move to an out of the way position when contacted by a tire iron or by elements of a tire mounting machine to prevent damage to the circuit when a tire is mounted or demounted. In accordance with another embodiment of the invention, the circuit (16) is encased within a unitary annular member (56).

9 Claims, 11 Drawing Figures

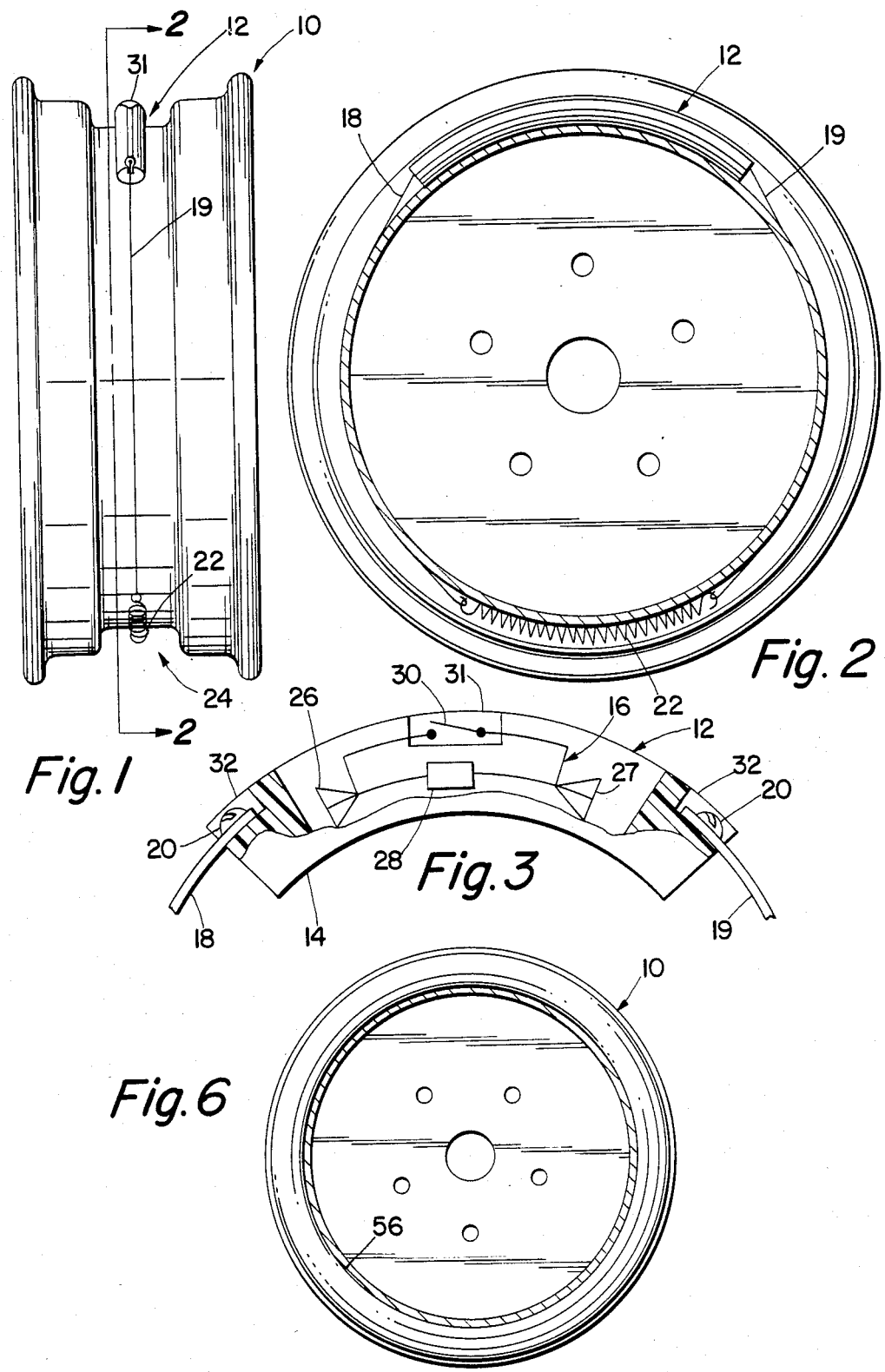

CIRCUIT MOUNTING APPARATUS

The present invention relates to means for mounting an electrical circuit in a vehicle wheel, and more particularly to apparatus for mounting a tire pressure monitoring circuit within a vehicle wheel.

Since the invention of the pneumatic tire and its application to motor vehicles such as automobiles, trucks and the like, many schemes have been proposed to monitor the fluid pressure in the tires during operation of the vehicle. Such systems facilitate maintaining optimum fluid pressure in pneumatic tires, which extends tire life.

It will be apparent from a reading of the specification that the present invention may be advantageously utilized with pneumatic tires intended for many different applications. However, the invention is especially useful when applied to relatively high speed "on road" motor vehicles, and will be described in connection therewith.

A major problem in any tire pressure monitor is the transmission of fluid pressure information from the tire to the operator. There are several approaches to this problem. For example, fluid pressure information can be transmitted through an inductive coupling involving two transducers, one on the wheel and one on the vehicle body, which are in precise rotational alignment with one another. Another example is the application of transmitters and receivers which use the atmosphere to bridge the interface between the wheel and body.

In any of such systems it is necessary to provide some form of electrical circuitry on or within each vehicle wheel. In some cases this will include active circuit elements such as transmitters and generators, while in other cases it may include only passive elements such as antennae. While components of such circuitry can be mounted on an exterior portion of the vehicle wheel it is considered to be most advantageous to use the open area of the drop-center portion of a typical vehicle wheel.

There are, however, certain problems associated with mounting elements in the drop-center of a vehicle wheel, and particularly when fragile elements such as electric circuitry are involved. The most serious of these problems is the danger of damaging a component when a tire is being mounted onto the wheel, or removed therefrom. More specifically, the mounting and demounting of tubeless tires requires the use of so-called breaker bars or shoes and other tools which necessarily enter the drop-center region in the mounting and demounting processes.

It can be appreciated that tire changing is an unsophisticated process and is most often carried out either manually or on standardized tire changing fixtures. Compounding the problem is the fact that it is likely that a person changing a tire on a wheel equipped with tire pressure monitoring circuitry will not be aware of the presence of such circuitry and, therefore, cannot be expected to take special precautions to avoid damaging it.

Accordingly, the present invention is based on the assumption that to be practical a tire pressure monitoring system, and particularly the portion of such a system which is mounted on a vehicle wheel, must be designed to be compatible with existing methods for changing tires without regard for how unsophisticated these methods may be.

Two approaches are suggested as possible solutions to this problem. One is to mount the circuit components in such a way as to be protected from damage caused by contact with a breaker bar or tire iron or the like, such as by encasement within an impact resistant housing. This is not considered to be a desirable approach because the forces applied by tire changing equipment can be so high that a housing capable of withstanding such forces would be prohibitively heavy and expensive to manufacture.

What the present invention provides is a mounting arrangement which is very simple in detail and very light in weight, and which is configured in such a way that the electrical circuitry is enclosed within a very light housing element which when contacted by a piece of tire changing equipment simply moves out of the way without incurring damage. More specifically, in accordance with the invention, the wheel-associated pressure monitoring circuitry is encased within a cylindrical section formed of plastic or the like which is resiliently received in encircling relation to the automobile wheel within the drop-center. According to one aspect of the invention the circuit is received within a rigid plastic cylindrical section, the ends of which are connected by a spring-loaded wire which encircles the wheel. According to another aspect, the circuit is enclosed within a continuous tube of a resilient, cellular material which encircles the wheel.

Other features and advantages of the invention will be apparent from the following description when considered in connection with the accompanying drawings, wherein:

FIG. 1 is a front elevation view of a vehicle wheel upon which the invention has been mounted;

FIG. 2 is a sectional view taken at line 2—2 of FIG. 1;

FIG. 3 is an enlarged, fragmentary elevation view of the circuit-carrying portion of the invention with a portion cut away for purpose of illustration;

FIG. 6 is a sectional view similar to FIG. 2 but showing an alternative embodiment of the invention.

Figure 4A:
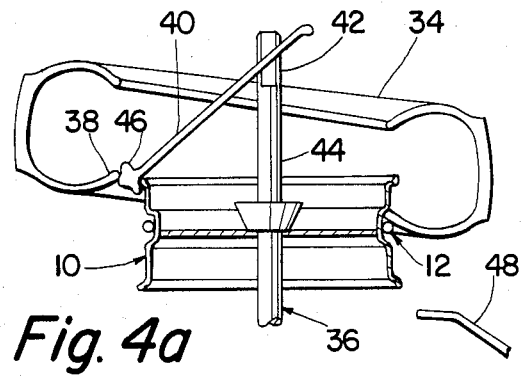
FIGS. 4a to 4c illustrate various steps in the mounting of a tire on a wheel rim on which the invention has been mounted.

Referring to FIGS. 1 and 2, there is illustrated a vehicle wheel 10 onto which a tire pressure monitoring circuit assembly 12 has been assembled. Referring also to FIG. 3, the circuit assembly 12 comprises a rigid plastic housing 14 which encloses an electrical circuit 16 (shown schematically for illustrative purposes), first and second retaining wires 18 and 19, each of which has one end attached to the housing 14 by means of a screw 20, and an extension spring 22 connecting the opposite ends of the wires 18 and 19. As shown in FIG. 1, the circuit assembly is received within the drop center portion 24 of the wheel 10.

Referring particularly to FIG. 3, the circuit 16 illustrated is a type of circuit which is capable of being used in a tire pressure monitoring system wherein a visual indication of a low tire pressure condition can be provided on the instrument panel of a vehicle. It will be appreciated that the present invention is not restricted to any particular tire monitoring system, but is applicable to the mounting of various types of elements of such a system which must be located on the vehicle wheel. In the embodiment used for illustrative purposes herein, the circuit 16 is an antenna circuit wherein a transceiver (not shown) located in a fixed position adjacent the wheel 10, such as in a wheel well, transmits a signal to the antenna. The signal is received by a first loop 26 of the antenna, and radiated back to the transceiver by a second loop 27, after being modified in a predetermined manner by a modifying circuit element 28. When a low pressure condition exists the pressure switch 30 closes thereby shunting the circuit element 28 such that the signal returned to the transceiver is changed from the modified signal normally returned. This change in signal can then be used to actuate some form of display to indicate that the tire pressure is low. The pressure switch 30 can be the type of switch shown in FIG. 4 of U.S. Pat. No. 4,335,283, which is set to close when the pressure in the tire cavity falls to a predetermined value. The modifying circuit element 28 can be any form of circuit which produces a detectable change in a signal characteristic received by the first antenna loop 26.

The circuit 16 can be inserted in a slot formed in the plastic housing 14 and then potted in place, leaving an opening 31 which serves as a port to enable the pressure switch to sense the pressure inside the tire.

It can be appreciated that the present invention is not restricted to the illustrated circuit 16, and that the mounting means disclosed herein can be used for various forms of tire pressure monitoring elements capable of being mounted in the drop center of a wheel.

One end of each of the retaining wires 18 and 19 is formed into a loop and received in a recess 32 formed adjacent the end of the plastic housing 14, and retained by a screw 20. The opposite ends of the wires are formed into loops which are received by the ends of extension spring 22. The extension spring puts sufficient tension on the retaining wires to hold the circuit assembly 12 sufficiently snug against the wheel so that it won't rotate relative to the wheel under heavy braking or come free of the wheel due to centrifugal force. The spring 22 can be selected so that its weight balances the weight of the circuit assembly 12 so that the mounting of the assembly does not affect the balance of the wheel. As described below, it is important that the assembly can be moved when contacted by a tire iron or assembly tool.

FIGS. 4 and 5 illustrate the effect on the circuit assembly of tire mounting and demounting procedures.

Figure 4B:
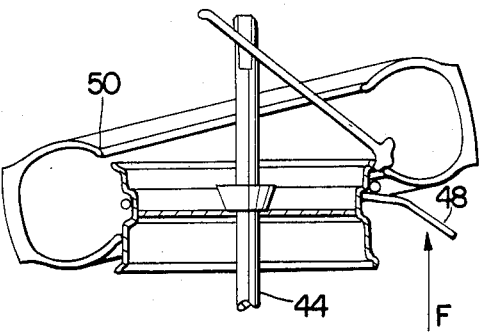
Figure 4C:
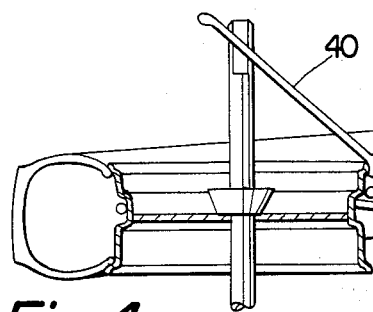

In FIG. 4a, a tire 34 has been placed in position for mounting on the wheel 10, which has been placed on a conventional tire mounting machine 36, for example a model 40-40A machine manufactured by the Coats Company Inc. As shown, the bottom bead 38 of the tire has been placed partially over the upper wheel rim with a mounting tool 40 in place between the rim and the bead. The tool 40 has a longitudinal slot formed through it which is received over flats formed on the upper end 42 of the central spindle 44 of the mounting machine. To put the lower bead completely in place the spindle 44 is rotated to cause a specially shaped end portion 46 of the tool to force the bead over the rim. In order to get the bottom bead completely over the rim it is necessary to move a first breaker shoe member 48 of the machine from a lower position as shown in FIG. 4a to an upper position as shown in FIGS. 4b and 4c by applying a substantial force in the direction of the arrow F in FIG. 4b. As shown in FIG. 4b, if the shoe 48 should contact the circuit assembly 12 it will displace it against the force of spring 22 to a position outside the drop center until the shoe can be removed; however, the mounting structure of the invention permits the circuit assembly to be displaced without damage.

The top bead 50 of the tire is installed in a similar manner using the tool 40 to force the bead over the rim. In order to complete this procedure, the breaker shoe 48 is maintained in its upper position, displacing the circuit assembly as described above.

As shown in FIG. 4c, the top bead is completely installed by rotating the tool 40 around the tire from the position shown in FIG. 4b with the breaker shoe 48 still in position against the bottom bead. Once the top bead is installed over the rim the tool 40 and breaker shoe 48 are removed, and the tire can be inflated.

Figure 5A:
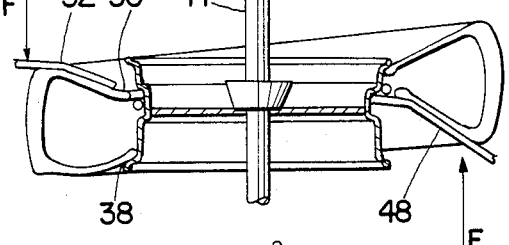
FIGS. 5a to 5d illustrate various steps in the demounting of the tire shown in FIG. 4.
Figure 5B:
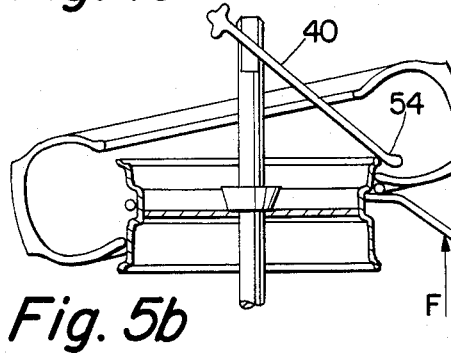
Figure 5C:
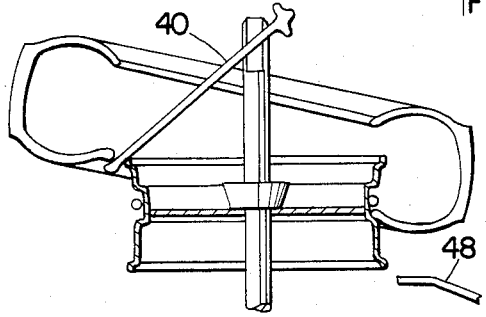
Figure 5D:
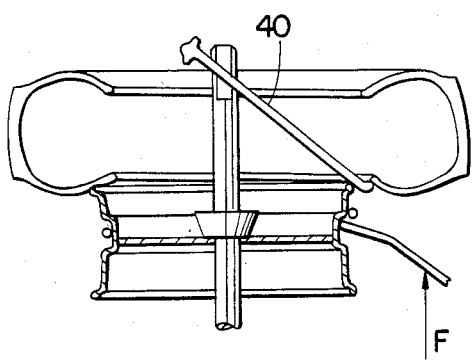

In order to remove a mounted tire, the beads 38 and 50 must first be broken away from the rim. As shown in FIG. 5a, this is accomplished by inserting the first breaker shoe 48 against the bottom bead 38, and a second breaker shoe 52 against the top bead. The breaker shoes are then raised and lowered respectively to the positions shown until both beads come free. As shown in FIG. 5b, the tool 40 is reversed from its assembly position and end 54 is placed between the top bead of the tire and the rim and the spindle 44 is rotated until the top bead comes free of the rim. To remove the bottom bead the tool 40 is placed between the bottom bead and the rim with the breaker shoes retracted as shown in FIG. 5c, and the spindle 44 is rotated. To ease removal of the bottom bead the breaker shoe 48 is raised temporarily into engagement with the tire until the bottom bead comes completely free of the rim, as shown in FIG. 5d.

As shown in FIGS. 5a-5d there are several stages in the demounting process in which the tire bead or one of the breaker shoes can come into contact with the circuit mounting assembly, and in each case the assembly simply moves to an out-of-the-way position so that no damage is done to the circuit element.

Referring to FIG. 6, there is shown an alternative embodiment of the invention in which the electrical circuit element 16 is encased within a flexible annular member 56, thus eliminating the need for separate retaining wires and a spring. The annular member is in interference fit with the drop center 24 so that it does not tend to rotate relative to the wheel or come free of the rim due to centrifugal force. The annular member can be formed of a plastic foam or some other flexible plastic material, and is itself inherently balanced; however, depending on the weight of the components of the electrical circuit 16 it may be necessary to add a balance weight opposite the circuit to avoid throwing the vehicle wheel out of balance. The manner in which the circuit is attached to the annulus is not critical to the invention, and may be accomplished by forming a radial slit large enough to enclose the circuit or by molding the circuit directly in the annulus.

We claim:

1. Apparatus for mounting a tire condition monitoring element within a tire mounted on a wheel comprising a cylindrical housing formed into an arcuate shape having an inside radius substantially corresponding to the radius of the drop center portion of the wheel, and means for mounting said element to said housing, said housing including resilient means encircling said wheel and applying a sufficient tensile force to said housing to normally maintain it in contact with the surface of said drop center portion while permitting radial and lateral displacement of said housing within said drop center portion when engaged by an object inserted into the drop center portion.

2. Apparatus as claimed in claim 1 in which said housing is in the form of a closed ring formed of a resilient material.

3. Apparatus for retaining a tire condition monitoring element within a tire mounted on a wheel comprising a cylindrical housing formed into an arcuate shape having an inside radius substantially corresponding to the radius of the drop center portion of the wheel, means for mounting said element to said housing, and biasing means fixed to said housing and encircling said wheel operable to apply a sufficient tensile force to said housing to normally maintain said housing in contact with said wheel while permitting radial and lateral displacement of said housing within said drop center portion when engaged by an object inserted into the drop center portion.

4. Apparatus as claimed in claim 3 in which said housing comprises a cylinder formed of a relatively rigid plastic material.

5. Apparatus as claimed in claim 4, in which said biasing means comprises an extension spring having its ends operatively connected to the ends of said housing.

6. Apparatus as claimed in claim 5, including a first wire having one end connected to one end of said housing, a second wire having one end connected to a second end of said housing, and an extension spring connecting the opposite ends of said first and second wires.

7. Apparatus as claimed in claim 6, in which said spring is disposed substantially 180 degrees from said housing when said assembly is mounted on a wheel, the weight of said spring being substantially equal to the weight of said housing, whereby said apparatus does not affect the balance of said wheel.

8. Apparatus as claimed in claims 1 or 3, in which said element is an electrical circuit, and including means substantially enclosing said element within said housing.

9. Apparatus as claimed in claim 8, in which said electrical circuit includes a pressure switch, said housing including a port exposing a sensing element of said switch to the atmosphere within said tire.

* * * * *